106-90   alkyl acid phosphate

United States Patent Office 2,848,340
Patented Aug. 19, 1958

2,848,340

SLOW SETTING CEMENT COMPOSITIONS

Walter J. Haldas, Houston, Tex., assignor to Lone Star Cement Corporation, New York, N. Y., a corporation of Maine No Drawing. Application July 5, 1956
Serial No. 595,836

6 Claims. (Cl. 106—90)

My invention relates to the retardation of the setting rates of Portland cement compositions at elevated temperatures and pressures by the incorporation of small amounts of alkyl acid phosphates, with or without the addition of bentonite.

Cement compositions having retarded setting rates are useful for a number of purposes including the cementation of deep oil wells; an application for which the compositions and method of the present invention are particularly suitable. In oil well cementing practice, Portland cement is normally mixed with about 40–50 percent of water, based on the weight of the dry cement, to form a slurry which is pumped into the well to the desired point behind the casing and allowed to harden. Inasmuch as oil wells are frequently of great depth, extended cementing times are required to mix the cement slurry and pump it to the desired point. It is important, therefore, that the cement employed have a thickening time long enough to allow placement of the cement slurry at the desired location in the well before it becomes stiff and unpumpable. Experience has shown that ordinary construction cements serve satisfactorily for the cementation of oil wells ranging in depth down to about 8,000 feet. At greater depths, however, the elevated pressures and temperatures encountered accelerate the normal setting rate of ordinary cements to the point where the cementing time approaches or exceeds the thickening time of the cement making it difficult or impossible to place the cement slurry at the desired location in the well.

Various methods of retarding the setting rates of cements have been employed in order to make possible the cementation of oil wells greater than 8,000 feet in depth. In general, cements for use in oil wells are coarsely ground materials prepared by (1) altering the composition of the cement itself, (2) adding various special retarding agents to the cement, or (3) a combination of methods 1 and 2. As an example of the first method, the thickening time of Portland cement can be increased by reducing the tricalcium aluminate content substantially to zero and materially reducing the tricalcium silicate content below normal levels. Special set retarding agents which have been employed include casein, sodium carboxymethylcellulose, carboxymethyl hydroxyethyl cellulose, dextrin, starch, compounds of boron, bicarbonates and tartrates, water soluble gums, and combinations of these and other materials. Special cements made by altering the composition of Portland cement, adding any of the various known special retarding agents, or by adding special retarding agents to the altered composition cements, generally have sufficiently extended thickening times to render them useful in wells at depths greater than 8,000 feet. In some cases these special cements can be successfully employed at depths down to about 16,000 feet, where circulating temperatures at the bottom of the well range upward to about 250° F. and pressures reach 15,000 to 16,000 p. s. i. However, at such temperatures and pressures, the setting rates of even the specially retarded cements leave little or no margin between the thickening time of the cement and the time required for mixing the cement slurry and pumping it into place in the well.

Prior to the present invention there were no known cements or retarders which could be used safely for oil well cementation at depths of 16,000 feet or more except in unusually cool formations. The retarders and cement compositions of the present invention, however, can be used satisfactorily at these extreme depths and thus fill a recognized need in the well drilling industry.

My invention resides in the discovery that the thickening rate of a Portland type cement including any ASTM type II cement, can be sufficiently retarded by the incorporation of from about 0.1 to about 2.0% by weight, based on the dry cement, of an alkyl acid phosphate to provide a cement composition useful under the extreme temperatures and pressures encountered in extremely deep oil wells.

I have also discovered that the retarding effect of the alkyl acid phosphates is unexpectedly enhanced by incorporating in the cement composition up to about 10%, preferably about 2–6%, by weight, based on the dry cement, of bentonite or bentonitic materials together with the additional amount of water which is required to maintain the fluidity of a slurry of a bentonite-containing cement. I have found, further, that alkyl acid phosphate retarding agents can be employed with advantage with all types of cements, even with cements which already contain other special retarding agents. I prefer, however, for reasons of economy, to employ the alkyl acid phosphates with modified composition Portland cements, i. e., those in which the thickening rate has been retarded by reducing the tricalcium aluminate content to a minimum, or even to zero, and materially reducing the tricalcium silicate content below normal levels. Cements of this type require smaller amounts of retarder than cements of more normal composition. The normal tricalcium silicate content of Portland cements ranges from about 40–50%; the usual content being about 45%. Bentonite or bentonitic materials are preferably added to these compositions in the amounts noted above in order to enhance the effectiveness of the alkyl acid phosphate set retarding agents. Bentonite is a clay largely composed of montmorillonite, a mineral which has the property of holding very large quantities of water in a slurry. The term "bentonitic materials" employed herein refers to clays which contain at least a major proportion of montmorillonite. When bentonite is added to a cement, it is necessary as noted above to employ additional amounts of water when preparing the cement slurry. For example, each percent of bentonite incorporated in a cement composition required the addition of about 4 percent of water in addition to that requires by the cement alone order to maintain a fluid slurry; the percentages being by weight of the dry cement.

The desired retardation of the setting rates of Portland-type cements which is characteristic of the present invention can be achieved by the use of any alkyl acid phosphate. The preferred phosphates, however, are the lower alkyl acid phosphates which include both monoalkyl and dialkyl acid phosphates having up to about 6 carbon atoms per alkyl group. Especially suitable acid phosphates for use in my invention contain 1 or 2 methyl or ethyl groups or 1 methyl and 1 ethyl group. These phosphates are generally less expensive and more readily available than the higher alkyl phosphates. Specific alkyl acid phosphates which have been employed with excellent results include dimethyl acid pyrophosphate, monomethyl acid pyrophosphate, dimethyl acid orthophosphate, monomethyl acid orthophosphate, diethyl acid phosphate, monoethyl acid phosphate, ethyl methyl acid phosphate, dipropyl acid phosphate, and monopropyl acid phosphate. Other acid alkyl phosphates which can be employed with advantage in the present invention include dibutyl acid phosphate, dipentyl acid phosphates, dihexyl acid phosphates, and acid phosphates containing a single 4, 5 or 6 carbon atom alkyl group or such a group in addition to a methyl, ethyl or propyl group.

In practicing my invention, I prefer to supply the alkyl acid phosphates to the cement slurry in the mixing water since many of these phosphates are water-soluble liquids. The phosphates can, however, be incorporated in Portland-type cement compositions in any other convenient manner as, for example, by intergrinding with the cement.

In order to illustrate the present invention, the thickening times of a number of commercially available Portland-type oil well cements were compared with the time requirements for mixing and pumping the slurry established by the American Petroleum Institute Code 10B for testing oil well cements. These tests were made in a Stanolind Pressure Consistometer which permits the simulation of deep well cementing conditions by measurements of cement slurry consistency while the slurry is being subjected to the temperatures and the pressures found in actual oil well cementing operations. The results of these tests are set out in Table I below.

Table I

| A. P. I. Code 10B Requirements | | | | Commercial Cement | Thickening Time, Min. |
|---|---|---|---|---|---|
| Simulated Well Depth, ft. | Bottom Hole, Temp., °F. | Bottom Hole, Pressure, p. s. i. | Cementing Time, Min. | | |
| 12,000 | 172 | 10,227 | 74 | Brand A | 159 |
| 14,000 | 206 | 13,386 | 84 | | 111 |
| 16,000 | 248 | 16,144 | 91 | | 98 |
| 18,000 | 300 | 18,800 | 100 | | 68 |
| 12,000 | | | 74 | Brand B | 333 |
| 14,000 | Same as above | | 84 | | 218 |
| 16,000 | | | 91 | | 90 |
| 18,000 | | | 100 | | 82 |
| 12,000 | | | 74 | Brand C | 173 |
| 14,000 | Same as above | | 84 | | 191 |
| 16,000 | | | 91 | | 92 |
| 18,000 | | | 100 | | 70 |
| 12,000 | | | 74 | Brand D | 132 |
| 14,000 | Same as above | | 84 | | 122 |
| 16,000 | | | 91 | | 96 |
| 18,000 | | | 100 | | 78 |
| 12,000 | | | 74 | Brand E | 370 |
| 14,000 | Same as above | | 84 | | 212 |
| 16,000 | | | 91 | | 93 |
| 18,000 | | | 100 | | 80 |

*Note.*—Brand A commercial cement is a modified composition Portland cement containing substantially no tricalcium aluminate and only about 30% tricalcium silicate. Commercial cements, brands B, C, D, and E, are Portland cements containing various special retarding agents.

It is apparent from a study of Table I that at temperatures of about 248° F. and higher and pressures of about 16,000 p. s. i. or more the difference between the setting time of the cement compositions tested and the time required to place the cement in the well at the proper depth becomes so slight that in many instances it would be extremely difficult or impossible to accomplish. In other words, the commercially available cement compositions tested would not be satisfactory, as a rule, at depths greater than about 16,000 feet.

In contrast to the performance of the commercially available oil well cementing compositions tested above, the compositions of the present invention are entirely satisfactory at extreme well depths where temperatures of about 250° F. or higher and pressures of 16,000 p. s. i. or more are encountered. This fact is illustrated by a series of tests made according to the American Petroleum Institute Code 10B procedure employed above except that the conditions were chosen to simulate those encountered at well depths of 14,000, 16,000 and 18,000 feet. The results of these tests which were carried out employing diethyl acid phosphate with and without bentonite as the retarding agent are set forth in Table II below. Similar setting time retardation can be achieved in greater or lesser degree with the other acid alkyl phosphates described above. The cement employed in these tests (brand A of Table I), contained no tricalcium aluminate and only about 30 percent of tricalcium silicate. The cement had the following average composition:

| | Percent |
|---|---|
| Silica ($SiO_2$) | 24.0 |
| Alumina ($Al_2O_3$) | 3.2 |
| Iron oxide ($Fe_2O_3$) | 6.9 |
| Lime (CaO) | 62.6 |
| Magnesia (MgO) | 1.0 |
| Sulph anhydride ($SO_3$) | 1.2 |
| Loss on ign | 0.5 |
| $Al_2O_3/Fe_2O_3$ ratio | 0.46 |

Table II

| Simulated Well Depth (Percent Water to Cement) | Percent Retarder | Thickening Time in Minutes | | | |
|---|---|---|---|---|---|
| | | No Bentonite | 2.0 Percent Bentonite | 4.0 Percent Bentonite | 6.0 Percent Bentonite |
| | | 36 | 40 | 48 | 52 |
| 14,000 | None | 92 | 89 | 118 | 83 |
| 14,000 | 0.20 | 140 | 177 | 215 | 188 |
| 16,000 | 0.20 | 100 | | 125 | 140 |
| 18,000 | 0.20 | | | 102 | 109 |
| 14,000 | 0.40 | 172 | 240 | 253 | 265 |
| 16,000 | 0.40 | 118 | 135 | 164 | 340 |
| 18,000 | 0.40 | | 111 | 146 | 176 |
| 14,000 | 0.60 | 190 | 236 | 302 | 282 |
| 16,000 | 0.60 | 130 | 157 | 228 | 344 |
| 18,000 | 0.60 | 81 | 121 | 164 | 188 |
| 14,000 | 0.80 | 268 | 297 | 300 | 285 |
| 16,000 | 0.80 | 152 | 190 | 310 | 331 |
| 18,000 | 0.80 | 106 | 125 | 169 | 189 |
| 14,000 | 1.00 | 272 | 316 | 325 | 299 |
| 16,000 | 1.00 | 173 | 206 | 280 | 294 |
| 18,000 | 1.00 | 92 | 119 | 210 | 182 |

The data above also illustrates the surprising discovery that bentonite increases the effectiveness of the alkyl acid phosphates as set retarders. This would not be expected since it has been repeated that the addition of bentonite alone normally quickens the setting rate of cements. For example, see Salathiel Patent 2,582,459, col. I, lines 29–34.

The above specific examples of cement compositions having setting rates retarded by the addition of alkyl acid phosphates are merely illustrative and are not to be construed as limiting the scope of the present invention. The term "Portland cement" employed in the claims is intended to include any ASTM type II cement, all Portland-type cements, ordinary Portland cement and Portland cement containing less than normal amounts of tricalcium aluminate and tricalcium silicate or otherwise modified to retard its setting rate.

I claim:

1. A slow setting cement composition suitable for the cementation of oil wells at depths in excess of 8,000 feet consisting essentially of Portland cement and from about 0.1% to about 2.0% by weight, based on the dry cement, of a lower alkyl acid phosphate.

2. A slow setting cement composition suitable for the cementation of oil wells at depths in excess of 8,000 feet consisting essentially of Portland cement, about 0.1% to about 2.0% by weight of a lower alkyl acid phosphate and bentonite in an amount up to about 10% by weight, based on the dry cement.

3. A slow setting cement composition suitable for the cementation of oil wells at depths in excess of 16,000 feet which consists essentially of (1) a Portland cement containing substantially no tricalcium aluminate and materially less than about 45% of tricalcium silicate, (2)

bentonite in an amount up to about 10% by weight based on the dry cement and (3) about 0.1% to about 2.0% by weight, based on the dry cement, of a lower alkyl acid phosphate.

4. An aqueous slurry of the composition of claim 1.
5. An aqueous slurry of the composition of claim 2.
6. An aqueous slurry of the composition of claim 3.

References Cited in the file of this patent

UNITED STATES PATENTS

| 2,233,973 | Dunn | Mar. 5, 1941 |
| 2,582,459 | Salathiel | Jan. 15, 1952 |